June 26, 1945.    C. WANTZ ET AL    2,379,123
TURRET LATHE
Filed June 10, 1943    2 Sheets-Sheet 1
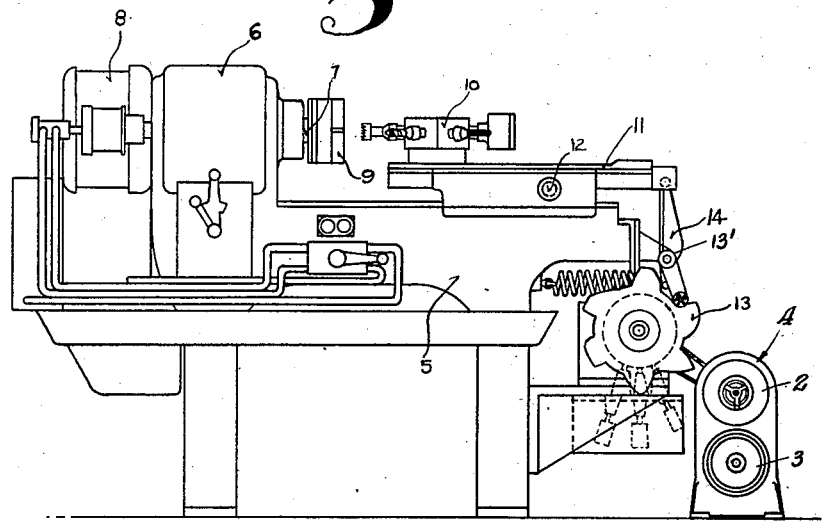
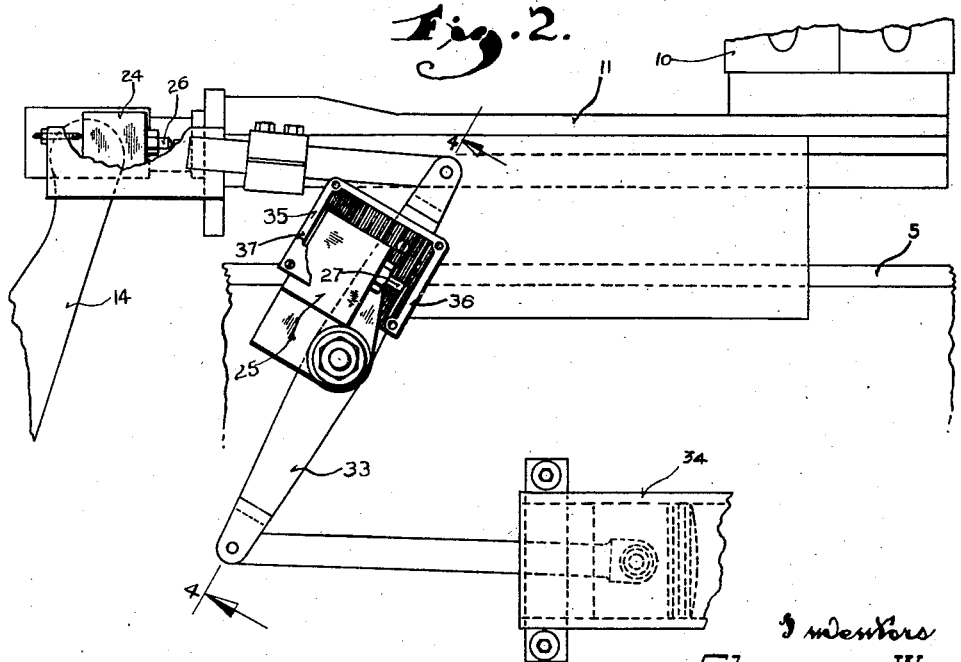

June 26, 1945.  C. WANTZ ET AL  2,379,123
TURRET LATHE
Filed June 10, 1943  2 Sheets-Sheet 2
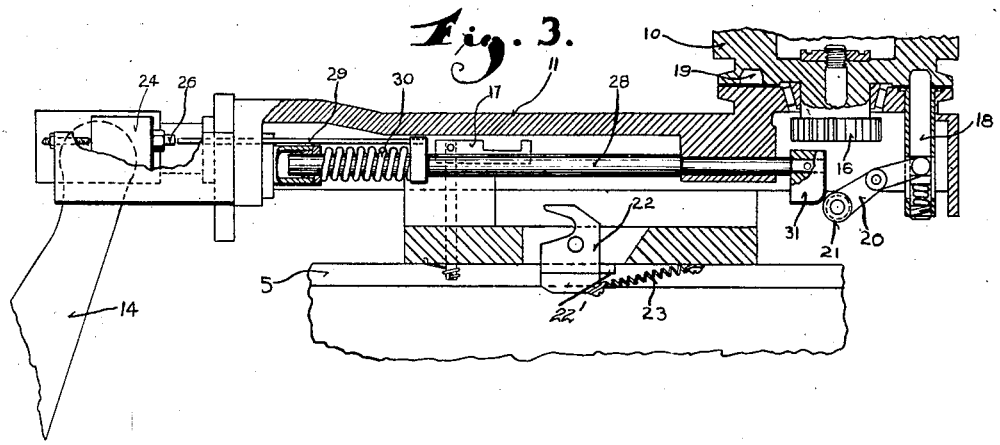
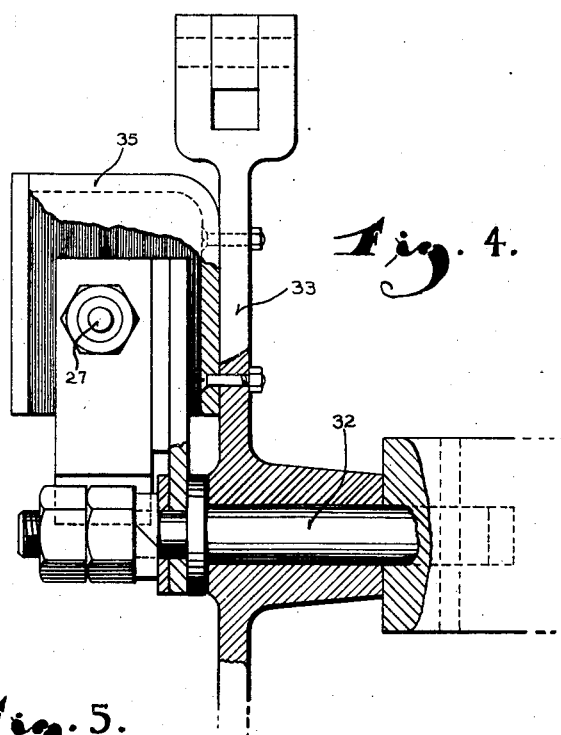
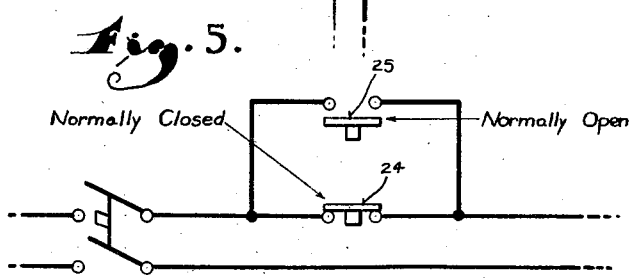
Inventors
Clarence Wantz
Charles E. Hajny Patented June 26, 1945

2,379,123

UNITED STATES PATENT OFFICE 2,379,123

TURRET LATHE

Clarence Wantz and Charles E. Hajny, Milwaukee, Wis., assignors to Milwaukee Gas Specialty Company, Milwaukee, Wis., a corporation of Wisconsin Application June 10, 1943, Serial No. 490,258

8 Claims. (Cl. 29—44)

This invention relates to turret lathes and refers particularly to semi-automatic turret lathes of the type illustrated in the copending application of Eugene E. Muesy, Serial No. 350,559, filed August 3, 1940.

In the operation of such semi-automatic turret lathes, and in fact in the operation of fully manually controlled turret lathes as by inexperienced operators, it sometimes happens that the turret is not properly indexed before being returned to its operative work performing position. As a result work and tools are damaged and accidents are liable to occur.

It is, therefore, an object of this invention to provide means controlled from the turret indexing function for preventing damage to the work and tools in the event the turret is not properly indexed.

As is well known, the turret is indexed during and consequent to its reciprocation from and back to its operative work performing position. If, through some mechanical failure or through laxity on the part of the operator in the case of a wholly manually operated lathe, the turret is not properly indexed its indexing latch does not engage. The mechanism for operating this latch thus provides a convenient actuator for an electric switch controlling a driving motor of the machine to stop the same in the event the turret is not properly indexed and prevent operation thereof until proper indexing has been effected.

It is therefore another object of this invention to provide a motor controlling switch and an actuator therefor driven by the operating mechanism of the turret latch.

Inasmuch as it is undesirable to interfere with the operation of the machine unless proper indexing of the turret is not effected, this invention has as another of its objects the provision of a holding switch in parallel with the indexing controlled switch which functions to keep the machine in operation except in the event of failure of the mechanism to properly index the turret.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention, constructed in accordance with the best mode so far devised for the practical application of the principles thereof, and in which:

Figure 1 is a front side view of a semi-automatic type turret lathe for which this invention is particularly adapted;

Figure 2 is a rear side view of the turret carriage and associated mechanism and illustrating the location of the two controlling switches;

Figure 3 is a view partially in longitudinal section and like Figure 2 taken from the rear of the lathe illustrating the mechanism for indexing and latching the turret and for actuating one of the controlling switches from the latch operating mechanism;

Figure 4 is a detail cross sectional view taken through Figure 2 on the plane of the line 4—4, illustrating particularly the manner in which the holding switch and its operating mechanism is associated and Figure 5 is a schematic diagram of that part of the electrical control system of the turret here in question.

Referring now particularly to the accompanying drawings, in which like numerals indicate like parts, the numeral 5 designates the supporting bed of a turret lathe mounted in the customary manner on supporting legs and equipped with a spindle head 6 and a spindle 7 driven by a motor 8.

The work is adapted to be gripped by a chuck 9 mounted on the spindle to hold the same in position to be acted upon by the tools carried by a turret 10. The turret 10 is mounted on a carriage 11 reciprocal on the bed.

If the lathe is manually operated, a hand lever (not shown) is provided to rotate a pinion shaft 12 for effecting reciprocation of the turret carriage, but in the lathe illustrated such reciprocation is effected by electric motor driven means indicated generally by the numeral 4 and including a cam 13 driven by a motor 3 through a variable speed drive transmission 2 suitably drivingly connected to the shaft of the cam 13. The cam produced motion is imparted to the turret carriage 11 by a cam follower 13' riding on the cam and operable to oscillate a lever 14 connected to the turret carriage. The specific manner in which this drive mechanism for reciprocating the turret functions is fully described and claimed in the aforesaid copending application of Eugene E. Muesy, Serial No. 350,559, filed August 3, 1940.

During reciprocation of the turret from and back to its operative work performing position the turret is indexed, that is, it is rotated on its axis to present the next tool to the work.

The manner in which this indexing is accomplished is old and well known and generally consists of a ratchet wheel 16 fixed to the turret and engageable with a pawl 17 carried by the bed of the lathe and positioned to cooperate with the ratchet wheel during reciprocation of the turret carriage.

It is also old to provide a latch for securely holding the turret in its indexed positions and generally this latch comprises a latch bolt 18 biased toward the underside of the turret to engage in keeper recesses 19. A pivoted lever 20 is provided to retract the latch bolt and free the turret for indexing. This lever carries a cam follower 21 cooperable with a cam 22 during reciprocation of the turret to withdraw the bolt 18 as will be readily apparent from Figure 3.

The relative positions of the cam 22 and the pawl 17 are such that the latch bolt is withdrawn before the indexing takes place, and as will be seen the cam 22 is pivotally mounted to swing out of the way during the return or advance stroke of the turret. A spring 23 yieldingly holds the cam in its operative position defined by a stop 22' against which the cam is yieldingly held by the spring.

In order to preclude the consequences of bringing the turret back into its operative work performing position though not properly indexed, two control switches 24 and 25 are provided to control a motor circuit as shown in Figure 5. As indicated in Figure 5 the switch 24 is normally closed, whereas the switch 25 is normally open. Being connected in parallel, when both these switches are open the control circuit governed thereby is disconnected from the power source. The switch 24 is opened during the retraction stroke of the turret and recloses if the turret is properly indexed. If the turret is not properly indexed the switch 24 remains open.

This switch 25, which may be considered a holding or bridging switch is normally open but is closed during initial retraction of the turret and reopened during initial advance of the turret.

The switch 24 is mounted on and travels with the turret carriage. Its specific construction forms no part of this invention except that its actuator is biased to closed position and movable to open position by depression of a push button 26.

The switch 25 is of similar construction being equipped with a push button actuator 27, but its actuator is biased to open position.

To actuate the switch 24 an actuator rod 28 is slidably mounted in the carriage with a finger 29 fixed thereto and positioned to engage the push button 26. A spring 30 biases the actuating rod 28 to its position shown in Figure 3 at which the finger 29 is free from the push button 26.

One end of the actuator rod is in juxtaposition to the lever 20. This end of the rod has an abutment 31 secured thereto in position to be engaged by the cam follower 21 as it rides up onto the cam 22. Such engagement of the cam follower with the abutment 31 retracts the latch bolt 18 and pushes the actuator rod against the tension of its spring to open the switch 24. The relationship of the parts is such that the switch 24 is opened before the bolt is fully retracted; and inasmuch as the turret begins to turn while the cam follower 21 is still on the cam so that the latch bolt bears against the underside of the turret when the cam follower leaves the cam the rod 31 remains in its actuated position holding the switch 24 open until the turret has been fully indexed and the latch bolt 18 snaps into the next recess 19. Hence, even though the turret is brought back to its operative work performing position (in the case of manual reciprocation), if it has not been properly indexed, the spindle motor cannot operate.

The bridging switch 25 which provides against interference with continued operation of the machine during normal indexing of the turret, is pivotally mounted on a stud 32 in such a way as to frictionally resist swinging movement thereof. The stud 32 also freely pivotally mounts a rocker arm 33 which is connected with the reciprocal carriage and a dashpot 34 to cushion reciprocation of the turret. This rocker arm 33 has a box-like hood 35 mounted thereon over the switch. One wall 36 of this hood is opposite the push button actuator 27 and its opposite wall 37 is positioned to collide with the back of the switch.

Thus during initial retraction of the turret carriage the wall 36 strikes the push button 27 to close the switch and then carry the switch with it, and during initial advance of the turret carriage frictional resistance to movement of the switch causes the wall 36 to move away from the button 27 and subsequently engages the wall 37 with the switch to swing the same back to its initial position.

From the foregoing description, taken in connection with the accompanying drawings, it will be readily apparent to those skilled in the art, that this invention provides an effective and practical manner of guarding against the difficulties resulting from improper indexing of a turret lathe.

What we claim as our invention is:

1. In a turret lathe having an electric motor driven spindle, a reciprocally mounted turret and means for indexing the turret during reciprocation thereof: a control for the spindle motor to stop the same in the event the turret is not properly indexed characterized by the provision of a motor-controlling-switch connected between the spindle motor and its power source and adapted to be opened by reciprocation of the turret and held open until the turret is properly indexed; and a holding switch in parallel with the motor-controlling-switch and adapted to be closed by reciprocation of the turret in one direction before the motor-controlling-switch is opened and to be reopened by initial reciprocatory movement of the turret in the opposite direction.

2. In a turret lathe having an electric motor driven spindle, a reciprocally mounted turret, electric motor driven means for reciprocating the turret and means for indexing the turret during reciprocation thereof in one direction, means for controlling one of said motors to stop the same in the event the turret is not properly indexed comprising: a motor-controlling-switch connected between the controlled motor and its power source; means operable by reciprocation of the turret in its indexing stroke for opening the switch; means for holding the switch open until the turret has been properly indexed; a holding switch in parallel with the motor-controlling-switch; means operable by reciprocation of the turret in its indexing stroke for closing the holding switch before the motor-controlling-switch is opened; and means operable by reciprocation of the turret in the opposite work performing stroke for reopening the holding switch.

3. In a turret lathe having an electric motor driven spindle, a reciprocally mounted turret, electric motor driven means for reciprocating the turret and means for indexing the turret during reciprocation thereof, means for controlling one of said motors to stop the same in the event the turret is not properly indexed comprising: a motor-controlling-switch connected between the controlled motor and its power source; operating means for the switch functioning in timed relation with reciprocation of the turret and adapted to open the switch in consequence to movement of the turret away from its operative work performing position; means for holding the switch open until the turret has been properly indexed; a holding switch in parallel with said motor-controlling-switch; and operating means for said holding switch functioning in timed relation with reciprocation of the turret for closing the holding switch during initial reciprocatory movement of the turret in one direction and for opening the switch during initial reciprocatory movement of the turret in the other direction.

4. In a turret lathe having a motor driven spindle; a turret reciprocable to and from an operative position, electric motor driven means for reciprocating the turret and means for indexing the turret during reciprocation thereof, means for controlling one of said motors to stop the same in the event the turret is not properly indexed comprising: two switches connected in parallel between the controlled motor and its power source, one of said switches being normally closed and the other normally open; means operable during retraction of the turret from its operative position for first closing the normally open switch and then opening the normally closed switch; means for retaining the normally closed switch open until the turret is properly indexed; and means operable by initial advance of the turret back to its operative position to reopen the normally open switch.

5. In a turret lathe having a turret mounted on a carriage for reciprocation to and from an operative position, means for indexing the turret during reciprocation thereof, a latch bolt for holding the turret in its indexed positions, and a cam follower engageable with a stationary cam during reciprocation of the turret carriage for retracting the latch bolt in advance of the indexing of the turret: an electric switch mounted on the carriage to reciprocate therewith; an actuator for the switch carried by the carriage; and means on said actuator in position to be engaged by the cam follower during cam produced movement of said follower for actuating the switch concomitantly with retraction of the latch bolt.

6. In a turret lathe having an electric motor driven spindle, a turret mounted on a carriage for reciprocation to and from an operative position, electric motor driven means for reciprocating the turret, means for indexing the turret during reciprocation thereof, a latch bolt biased to an operative position engaging in one of a plurality of keepers in the turret, and a cam follower engageable with a cam during reciprocation of the turret for retracting the latch bolt prior to the indexing of the turret, said latch bolt snapping into the next adjacent keeper upon proper indexing of the turret and restoring the cam follower to its normal position: an electric switch controlling one of said motors and mounted on the turret carriage; an actuator rod mounted on the turret carriage and having a part thereof engageable with the switch to operate the same; a spring biasing said actuator rod away from its switch actuating position and toward the cam follower; and means on said actuator rod engageable by the cam follower whereby response of the cam follower to the cam to retract the latch bolt operates the switch and retains it in the operated position until the latch bolt enters the next adjacent keeper.

7. In a turret lathe having an electric motor driven spindle, a reciprocally mounted turret and electric motor driven means for reciprocating the turret: an electric switch for controlling one of said motors; a movable member; a connection between said member and the turret whereby reciprocation of the turret moves said member through a predetermined range; means mounting the switch in a manner enabling movement thereof with said movable member but yieldingly resisting such movement; cooperating abutment means on the switch and said movable member for operating the switch to one position during initial reciprocation of the turret in one direction and for moving the switch bodily while retaining the switch in said operated condition during the remainder of the travel of the turret in said direction; and other abutment means on the switch and said movable member engageable during initial reciprocation of the turret in the opposite direction to first effect operation of the switch back to its previous position and thereafter bodily move the switch back to its initial position.

8. In a turret lathe having an electric motor driven spindle, a reciprocally mounted turret, means including an electric motor for reciprocating the turret and means for indexing the turret during reciprocation thereof: a control for one of said motors to stop the same in the event the turret is not properly indexed characterized by the provision of a motor-controlling-switch connected between the controlled motor and its power source and adapted to be opened by reciprocation of the turret and held open until the turret is properly indexed; and a holding switch in parallel with the motor-controlling-switch and adapted to be closed by reciprocation of the turret in one direction before the motor-controlling-switch is opened and to be reopened by initial reciprocatory movement of the turret in the opposite direction.

CLARENCE WANTZ.
CHARLES E. HAJNY.